US009321039B2

(12) United States Patent
Choi et al.

(10) Patent No.: US 9,321,039 B2
(45) Date of Patent: Apr. 26, 2016

(54) CATALYST FOR DECOMPOSITION OF PERFLUORINATED COMPOUND CONTAINING HALOGEN ACID GAS, AND PREPARATION METHOD THEREOF

(75) Inventors: Won Choon Choi, Daejeon (KR); Yong Ki Park, Daejeon (KR); Na Young Kang, Chungcheongnam-do (KR); Min-Whee Cho, Chungcheongbuk-do (KR); Song-Jong Cho, Chungcheongbuk-do (KR); Sung Ho Cho, Daejeon (KR); Sung Jin Yoon, Seoul (KR); Young-Ju Son, Busan (KR)

(73) Assignees: KOREA RESEARCH INSTITUTE OF CHEMICAL TECHNOLOGY, Daejeon-si (KR); ECOPRO CO., LTD., Chungcheongbuk-do (KR)

( * ) Notice: Subject to any disclaimer, the term of this patent is extended or adjusted under 35 U.S.C. 154(b) by 51 days.

(21) Appl. No.: 14/356,718

(22) PCT Filed: Aug. 16, 2012

(86) PCT No.: PCT/KR2012/006504
§ 371 (c)(1),
(2), (4) Date: May 7, 2014

(87) PCT Pub. No.: WO2013/069880
PCT Pub. Date: May 16, 2013

(65) Prior Publication Data
US 2014/0329667 A1    Nov. 6, 2014

(30) Foreign Application Priority Data

Nov. 9, 2011    (KR) .................... 10-2011-0116403

(51) Int. Cl.
*B01J 27/185* (2006.01)
*B01J 37/03* (2006.01)
*B01J 23/00* (2006.01)
*B01D 53/86* (2006.01)
*B01J 37/00* (2006.01)
(Continued)

(52) U.S. Cl.
CPC ......... *B01J 27/1856* (2013.01); *B01D 53/8662* (2013.01); *B01J 23/002* (2013.01);
(Continued)

(58) Field of Classification Search
CPC ...... B01J 21/04; B01J 23/462; B01J 27/1856; B01D 2257/2066; B01D 2258/0216; B01D 2255/2092; B01D 2255/1026; Y02C 20/30
USPC ......................... 502/213, 332, 355
See application file for complete search history.

(56) References Cited

U.S. PATENT DOCUMENTS 3,227,659 A * 1/1966 Brandenburg ..... B01D 53/8671
422/177
4,053,557 A * 10/1977 Kageyama ............. B01D 53/70
423/240 R
(Continued)

FOREIGN PATENT DOCUMENTS

JP         10-286438 A      10/1998
JP         2011-110477 A    6/2011
(Continued)

OTHER PUBLICATIONS

Toshio Okuhara et al.; "Effect of Potassium and Phosphorus on the Hydrogenation of CO over Alumina-Supported Ruthenium Catalyst", Journal of Catalysis, vol. 95, pp. 41-48, Sep. 1985.

*Primary Examiner* — Patricia L Hailey
(74) *Attorney, Agent, or Firm* — Ladas & Parry LLP

(57) ABSTRACT

The present invention provides a catalyst for the decomposition of a perfluorinated compound containing a halogen acid gas, and a preparation method thereof. According to the present invention, the Ru—P—Al tri-component catalyst for the decomposition of a perfluorinated compound shows an excellent decomposition activity and durability with respect to the decomposition and removal of a perfluorinated compound containing a halogen acid gas, and thus can be used to decompose a chamber cleaning gas, an etchant, a solvent and the like of a perfluorinated compound from the semiconductor manufacturing industry to the LCD processing field. In addition, the present invention can be useful for decomposing and removing a perfluorinated compound discharged in a process using a halogen acid gas such as $F_2$, $Cl_2$, $Br_2$ and the like.

10 Claims, 2 Drawing Sheets

(52) U.S. Cl.
CPC ............ *B01J37/0045* (2013.01); *B01J 37/031* (2013.01); *B01D 2255/1026* (2013.01); *B01D 2255/2092* (2013.01); *B01D 2257/2066* (2013.01); *B01D 2258/0216* (2013.01); *B01J 2523/00* (2013.01); *Y02C 20/30* (2013.01)

(56) References Cited

U.S. PATENT DOCUMENTS

| | | | | |
|---|---|---|---|---|
| 4,390,456 A | * | 6/1983 | Sanchez | B01J 21/04 423/628 |
| 5,290,429 A | * | 3/1994 | Delaney | B01J 23/883 208/145 |
| 5,396,022 A | * | 3/1995 | Wu | C07C 7/1485 585/733 |
| 6,509,511 B1 | * | 1/2003 | Rossin | A62D 3/38 423/240 R |
| 6,673,326 B1 | * | 1/2004 | Rossin | A62D 3/35 423/219 |

FOREIGN PATENT DOCUMENTS

| | | | | |
|---|---|---|---|---|
| KR | 20040024775 A | | 3/2004 | |
| KR | 10-2004-0024775 | * | 3/2014 | ............... B01J 27/18 |

* cited by examiner

CATALYST FOR DECOMPOSITION OF PERFLUORINATED COMPOUND CONTAINING HALOGEN ACID GAS, AND PREPARATION METHOD THEREOF

CROSS-REFERENCE TO RELATED APPLICATIONS

This patent application is a U.S. national phase under 35 U.S.C 371 of PCT/KR2012/006504 filed on Aug. 16, 2012, which claims the benefit of priority from Korean Patent Application No. 10-2011-0116403, filed on Nov. 9, 2011, in the Korean Intellectual Property Office, the disclosure of which is incorporated herein by reference in its entirety.

TECHNICAL FIELD

The present invention provides a catalyst for decomposition of perfluorinated compound containing halogen acid gas and a preparation method thereof.

BACKGROUND ART

As concerns grow over the global warming, we are required to come up with efficient technology to control generation of global-warming substances and to process them when these are generated. The perfluorinated compounds, which are discharged in the semiconductor industry only, are mainly used in the CVD and etching processes, and are very stable and non-toxic to human health. However, since it takes 1,000-10,000 years or longer to decompose, meaning a considerably long period of time of being remaining on earth, it is imperative to develop technologies to process and reduce the compounds.

Accordingly, countries gathered for the World Filtration Congress (WFC) 1999 and agreed to set the strict standards to reduce PFC emission. In particular, participants from semiconductor industries in Japan continued countrywide project to develop substitute gas for the perfluorinated compounds, and recover and process the same.

The perfluorinated compounds are generally processed by oxidation, plasma decomposition, chemical sorption, adsorption removal, low-temperature freezing process, or catalytic oxidation.

The oxidation is the process that decomposes the compound by burning with electric energy at high temperature, which is the most generally-used method. However, due to considerable electric energy consumption and need for a separate apparatus for treating byproducts after the compound decomposition, the overall systems becomes somewhat complicated.

The plasma decomposition is the method of decomposing compounds using plasma, which is very strong energy, and this method can advantageously decompose almost all the hardly-decomposable matters. However, the treatment is considerably difficult when there is a large amount of incoming gas, and the maintenance or repair is also relatively difficult due to the presence of powder which is generated during plasma decomposition.

The chemical sorption is a process that allows the perfluorinated compound to react with chemical sorbent. It provides advantage that the treatment is free of exhaust gas, because the byproduct generated after decomposition of perfluorinated compound reacts with the chemical sorbent. However, the method suffers economic problem, because it is necessary to periodically replace the sorbent to suffice relatively large sorbent consumption.

The catalytic oxidation is a process that allows decomposition of perfluorinated compound by catalyst at reduced reaction temperature with increased decomposition efficiency. While it uses similar principle as the oxidation, the method provides advantage of decreased oxidation temperature, and reduced use of energy because the oxidation occurs at low temperature. However, the method needs to periodically replace the catalyst, because the halogen compounds such as HF, $F_2$ that are generated after the reaction rapidly deteriorate the catalytic performance. Accordingly, researchers have worked on various ways to resolve the above-mentioned problem, such as, for example, regenerating the catalyst, which turns inactive by the contact with the halogen compounds, back into original catalytic state, by contacting the inactive catalyst with water vapor, or forming film on the catalyst surface, etc.

JP Patent Publication Nos. 11-70332 and 10-46824 made suggestion to decompose perfluorinated compound by metal supported aluminum oxide catalyst, which is prepared by supporting one or more of transition metals such as Zn, Ni, Ti, or Fe on alumina using precursors of metal complex, and U.S. Pat. Nos. 6,023,007 and 6,162,957 propose the use of a variety of metal phosphate catalysts for the decomposition of perfluorinated compounds. However, it requires rather complicated method to prepare aluminum phosphate in a form of multi-component complex oxide to which metal component is separately added, not to mention economic disadvantage and uncertainty as to whether it can be used for a long period of time. Accordingly, further improvements are required to increase catalyst durability and economy.

The present inventors have been able to prepare a catalyst for decomposing perfluorinated compound, which can completely decompose the perfluorinated compound containing acidic halogen compounds exhausted in semiconductor fabrication or LCD fabrication process, and which has high durability and thus can maintain catalytic activity for a long period of time, and thus completed the present invention.

DISCLOSURE

Technical Problem

It is an object of the present invention to provide a catalyst to decompose perfluorinated compound.

It is another object of the present invention to provide a method for preparing the catalyst suitable for the decomposition of perfluorinated compounds.

Technical Solution

In one embodiment, a Ru—P—Al tri-component catalyst to decompose perfluorinated compounds is provided, which may include an aluminum oxide catalyst, and promoters supported on the catalyst. The loading of promoters is in the range of 0.05-0.3 part by weight of ruthenium (Ru) and 1.0-5.0 part by weight of phosphorus (P) based on aluminum oxide catalyst weight.

In another embodiment, a method for preparing the Ru—P—Al tri-component catalyst is provided, which may include steps of: preparing precursor solution by dissolving, in distilled water, compound containing 0.05-0.3 part by weight of ruthenium, relative to weight of aluminum oxide; and compound containing 1.0-5.0 part by weight of phosphorus (P), relative to weight of aluminum oxide (Step 1), and depositing ruthenium and phosphorus in aluminum oxide, using the precursor solution prepared at Step 1 (Step 2).

Advantageous Effects

Since the Ru—P—Al tri-component catalyst according to various embodiments provide high decomposition effect and durability in decomposing and removing perfluorinated compounds containing acidic halogen gas, the Ru—P—Al tri-component catalyst can be advantageously used for the purpose of decomposing cleaning gas, etchant and solvent of the perfluorinated compounds exhausted in semiconductor manufacture industry or LCD fabrication field, or decomposing and removing perfluorinated compound exhausted in a process that uses halogen acidic gas such as $F_2$, $Cl_2$, $Br_2$.

BEST MODE

Figure 1:
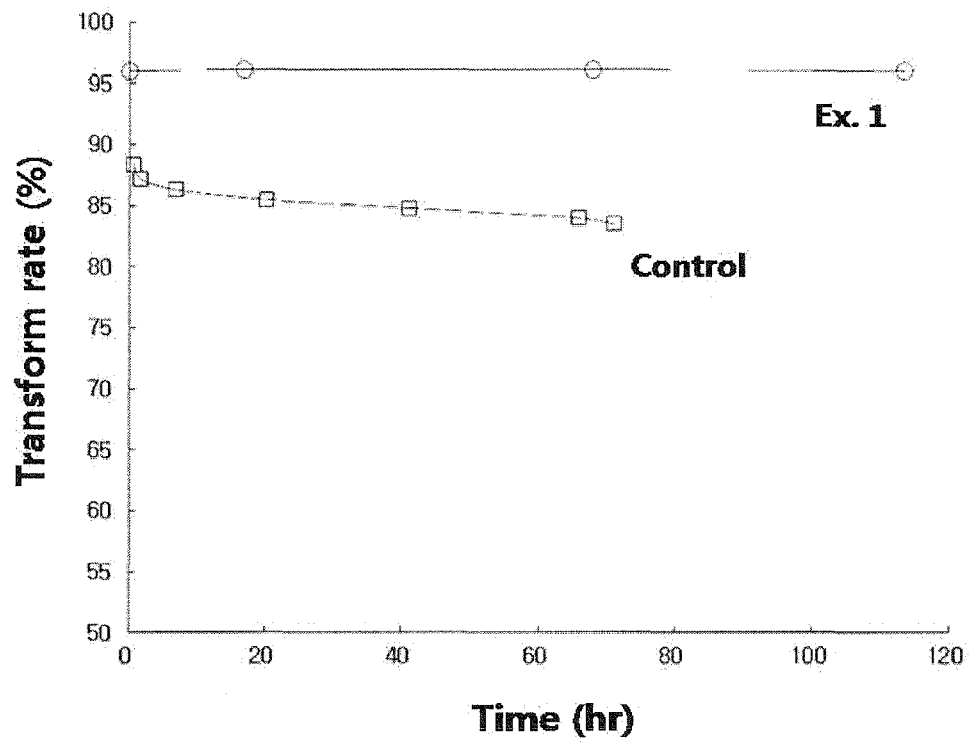
FIG. 1 shows catalysts performance for the decomposition of perfluorinated compounds.

In one embodiment, a Ru—P—Al tri-component catalyst to decompose perfluorinated compound is provided, which includes aluminum oxide catalyst, and promoter supported on aluminum oxide catalyst, which may include, with respect to 1 part by weight of the aluminum oxide catalyst, ruthenium (Ru) in an amount of from 0.05 to 0.3 parts by weight and phosphorus (P) in an amount of from 1.0 to 5.0 parts by weight.

The aluminum oxide may be selected from the group consisting of $\gamma$-$Al_2O_3$, $\gamma$-AlO(OH), $Al(OH)_3$, d-$Al_2O_3$, d-AlO(OH), d-$Al(OH)_3$, $\eta$-$Al_2O_3$, $\eta$-AlO(OH), and $\eta$-$Al(OH)_3$, and preferably, may use gamma-alumina, aluminum trihydrate or eta-boehmite.

The specific surface area may preferably be 20 $m^2$/g or above, to maintain high decomposition activity.

Further, the perfluorinated compounds may be those that include halogen acidic gas, such as, $CF_4$, $CHF_3$, $CH_2F_2$, $C_2F_4$, $C_2F_6$, $C_3F_6$, $C_3F_8$, $C_4F_8$, $C_4F_{10}$, $NF_3$, $SF_6$, which may include one or more of halogen gas such as $F_2$, $Cl_2$, $Br_2$ and halogen acidic gas such as HF, HCl, HBr.

Furthermore, the catalyst for decomposing the perfluorinated compounds may be used for the decomposition of perfluorinated compounds in the process that involves halogen acidic gas, such as, for example, semiconductor fabrication process or LCD fabrication process.

According to various embodiments, the Ru-p-Al tri-component catalyst for decomposing perfluorinated compounds exhibit superior decomposition activity and durability in the decomposition of perfluorinated compounds containing halogen acidic gas, and therefore, can be advantageously used for the purpose of decomposing chamber cleaning gas, etchant and solvent of the perfluorinated compounds exhausted in the semiconductor manufacture industry and LCD fabrication field or decomposing and removing perfluorinated compound discharged at a process that uses halogen acidic gas such as $F_2$, $Cl_2$, $Br_2$ (see Examples 1 to 4).

Furthermore, the present invention provides a method for producing a catalyst for decomposing the perfluorinated compounds, which may include steps of: dissolving compound containing ruthenium (Ru) in an amount of 0.05-0.3 parts by weight relative to weight of aluminum oxide with compound containing phosphorus (P) in an amount of 1.0-5.0 parts by weight relative to weight of aluminum oxide, to obtain precursor liquid (Step 1); and immersing Ru and P in the aluminum oxide, using the precursor liquid prepared at Step 1.

Step 1 involves preparation of Ru and P precursor liquid for coating on the aluminum oxide, and specifically includes process of preparing the precursor liquid by dissolving compound containing Ru in an amount of 0.05-0.3 parts by weight relative to weight of aluminum oxide, and compound containing P in an amount of 1.0-5.0 parts by weigh in distilled water.

The compound containing Ru may use one selected from the group consisting of rutheniumacethylacetate ($Ru(acac)_3$), rutheniumchloride ($RuCl_3$), rutheniumiodide ($RuI_3$), rutheniumnitrosyl nitrate ($Ru(NO_3)NO$), rutheniumoxide ($RuO_2.H_2O$), or preferably, rutheniumchloride ($RuCl_3$).

The compound containing ruthenium may be used in an amount of 0.05-0.3 wt %. If the content of ruthenium is lower than the above-mentioned range, i.e., when the compound containing ruthenium is used in an amount less than 0.05 wt %, resistance against halogen acidic gas decreases, and when the content of ruthenium is higher than 0.3 wt %, the decomposition activity is decreased due to lack of ruthenium dispersion.

The compound containing phosphorus may preferably use compound containing phosphorus which is free of metal component, and more preferably, use diammoniumhydrophosphate ($(NH_4)_2HPO_4$), or ammonium dihydrophosphate ($NH_4H_2PO_4$), phosphoric acid ($H_3PO_4$).

The compound containing phosphorus may preferably be used in an amount of 1.0-5.0 wt %. Outside the above-mentioned range, i.e., when the compound containing phosphorus is used in an amount less than 1.0 wt. %, although activity is sufficient, the stability deteriorates so that the catalyst gradually inactivates. When the compound containing phosphorus is used in an amount above 5.0 wt. %, the catalytic activity deteriorates.

Step 2 involves loading the ruthenium and phosphorus in aluminum oxide using the precursor liquid prepared at Step 1.

The loading at Step 2 may be performed by spray drying the precursor liquid prepared at Step 1 on aluminum oxide, or by adding aluminum oxide to the precursor liquid prepared at Step 1 and performing first drying in a 40° C., second drying at 100° C. or above, and calcination in 400-600° C. at air atmosphere and performing third drying.

The aluminum oxide may be selected from the group consisting of gamma-alumina ($\gamma$-$Al_2O_3$), gamma-boehmite ($\gamma$-AlO(OH)), gamma-alumina trihydrate ($Al(OH)_3$), delta-alumina (d-$Al_2O_3$), delta-boehmite (d-AlO(OH)), delta-alumina trihydrate (d-$Al(OH)_3$), eta-alumina ($\eta$-$Al_2O_3$), eta-boehmite ($\eta$-AlO(OH)), eta-alumina trihydrate ($\eta$-$Al(OH)_3$), or preferably, gamma-alumina, aluminum trihydrate or eta-boehmite.

The specific surface area may preferably be 20 $m^2$/g or larger, to maintain high decomposition activity.

Further, the perfluorinated compounds may be perfluorinated compounds, $F_2$, containing halogen acidic gas, such as, for example, $CF_4$, $CHF_3$, $CH_2F_2$, $C_2F_4$, $C_2F_6$, $C_3F_6$, $C_3F_8$, $C_4F_8$, $C_4F_{10}$, $NF_3$, $SF_6$ containing halogen gas such as $Cl_2$, $Br_2$ and one or more of halogen acidic gases such as HF, HCl, HBr.

MODE FOR INVENTION

The invention will be explained below with reference to examples and experimental examples. However, those examples or experimental examples are given herein only for the illustrative purpose, and therefore, the present invention is not limited to any examples or experimental example.

Example 1

Preparation of 0.3% Ru—P/Aluminum Oxide 0.3% Ru—P/aluminum oxide (hereinbelow, 'Ru—P—Al') catalyst was prepared by dissolving $H_3PO_4$ (106 g) and RuCl₃ (1.0 g) in distilled water (1290 g), mixing the resultant liquid with aluminum oxide (Al₂O₃) (1670 g) in an agitator for deposition, and performing first drying in 40° C. thermostat for 3 days, second drying at 100° C. or above, and calcinations for 6 hr with muffle furnace, in 400-600° C. at air atmosphere.

Example 2

Preparation of 0.05% Ru—P/Aluminum Oxide 0.05% Ru—P—Al catalyst was prepared with the same method as Example 1, except for difference that 0.125 g of RuCl₃ was used instead of 1.0 g.

Example 3

Preparation of 0.03% Ru—P/Aluminum Oxide 0.03% Ru—P—Al catalyst was prepared with the same method as Example 1, except for difference that 0.1 g of RuCl₃ was used instead of 1.0 g.

Example 4

Preparation of 0.015% Ru—P/Aluminum Oxide 0.015% Ru—P—Al catalyst was prepared with the same method as Example 1, except for difference that 0.05 g of RuCl₃ was used instead of 1.0 g.

Experimental Example 1

Measurement and Comparison of Removal Rates of Perfluorinated Compounds of Each Type of Catalyst The control group of the catalyst of Example 1 according to the present invention was prepared according to the method disclosed in related technology (Example 1 of KR Pat. No. 2004-0024775) and the following experiment was conducted to compare removal rate of perfluorinated compounds (CF₄) of the aluminum phosphate catalysts of Example 1 and KR2004-0024775.

The catalysts of Example 1 and KR2004-0024775, each in an amount of 3.3 g, were filled in ⅞" Inconel reaction tube, and 0.6 ml/min of tetrafluoromethane (CF₄), 189.4 ml/min of helium (He) and 0.04 ml/min of distilled water were supplied at 750° C. of reaction temperature using external heater, under CHSV 2000 h⁻¹ condition, so that tetrafluoromethane was decomposed under 5.0% Cl₂ coexistence. The transform rate of tetrafluoromethane was calculated by Mathematical Expression 1, and the reactant was analyzed with FT-IR. The result is provided in Table 1 below and FIG. 1.

$$CF_{4\,Rate}^{Convert}(\%) = \left(1 - \frac{CF_4\ concentration\ at\ reactor\ outlet}{CF_4\ concentration\ at\ reactor\ inlet}\right) \times 100$$

Mathematical Expression 1

TABLE 1

| | Removal Rate (%) | | | | |
|---|---|---|---|---|---|
| | 1 (day) | 3 (day) | 7 (day) | 10 (day) | 11 (day) |
| Ex. 1 | 98.0 | 96.0 | 96.0 | 96.0 | — |
| Control | 97.8 | 97.0 | 89.0 | 87.0 | 85.0 |

Referring to Table 1, 0.3% Ru—P—Al catalyst of Example 1 according to the present invention had tetrafluoromethane removal rate maintained at 98.0-96.0%, while the control group showed that tetrafluoromethane removal rate of aluminum phosphate catalyst, which was initially 97.8%, decreased over time, to 85.5% (see FIG. 1).

Accordingly, the Ru-p-Al tri-component catalyst for decomposing perfluorinated compounds exhibit superior decomposition effect and durability in the decomposition of perfluorinated compounds containing halogen acidic gas, and therefore, can be advantageously used for the purpose of decomposing cleanser, etchant and solvent of the perfluorinated compounds to in the semiconductor manufacture industry and LCD fabrication field or decomposing and removing perfluorinated compound discharged at a process that uses halogen acidic gas such as $F_2$, $Cl_2$, $Br_2$.

Experimental Example 2

Measure and Analysis of Perfluorinated Compounds Removal Rate According to Ru Concentration The following experiment was conducted to compare perfluorinated compounds (CF₄) removal rates of the catalysts prepared at Examples 2 to 4 according to concentrations thereof.

The removal rate of the perfluorinated compounds by the catalysts according to concentrations thereof was measured and analyzed with the identical method of Experimental Example 1, except for the difference of using 194.4 ml/min of He gas, 2.5 ml/min of distilled water, instead of injecting 189.4 ml/min of He gas, and 0.04 ml/min of distilled water. Table 2 below lists the result.

TABLE 2

| | Removal rate (%) | | | | |
|---|---|---|---|---|---|
| | 1 (day) | 3 (day) | 7 (day) | 10 (day) | 11 (day) |
| Ex. 2 (Ru 0.05%) | 98.0 | 95.0 | 94.0 | 94.0 | 94.0 |
| Ex. 3 (Ru 0.03%) | 97.0 | 93.7 | 93.0 | 93.0 | 92.0 |
| Ex. 4 (Ru 0.015%) | 98.0 | 96.7 | 93.0 | 92.0 | 88.4 |

Referring to Table 2, the initial removal rate of tetrafluoromethane of Ru—P—Al catalyst according to Examples 2 to 4 was 98.0-97.0%, which gradually decreased over time to 94.0-88.4%. Among these, the 0.05% Ru—P—Al catalyst of Example 2 has the tetrafluoromethane removal rate of 94.0% or above since day 7, and it was thus confirmed that the removal rate differed depending on Ru concentration, and that tetrafluoromethane removal rate is maintained above 90% at Ru concentration 0.03%.

Accordingly, the Ru—P—Al tri-component catalyst with minimum 0.03% Ru concentration provides high decomposition and durability in decomposing halogen acidic gas-containing perfluorinated compounds, and thus can be used for the purpose of decomposing cleanser, etchant or solvent of perfluorinated compounds in semiconductor fabrication industry or LCD processing field, and also decomposing and removing perfluorinated compounds discharged in the process that involves use of halogen acidic gas such as $F_2$, $Cl_2$, $Br_2$.

Experimental Example 3

Measurement of Perfluorinated Compounds Removal Rate According to Time

Experiment explained below was conducted to compare the removal rate of perfluorinated compounds ($CF_4$) over time, of the catalyst prepared according to Example 3.

Figure 2:
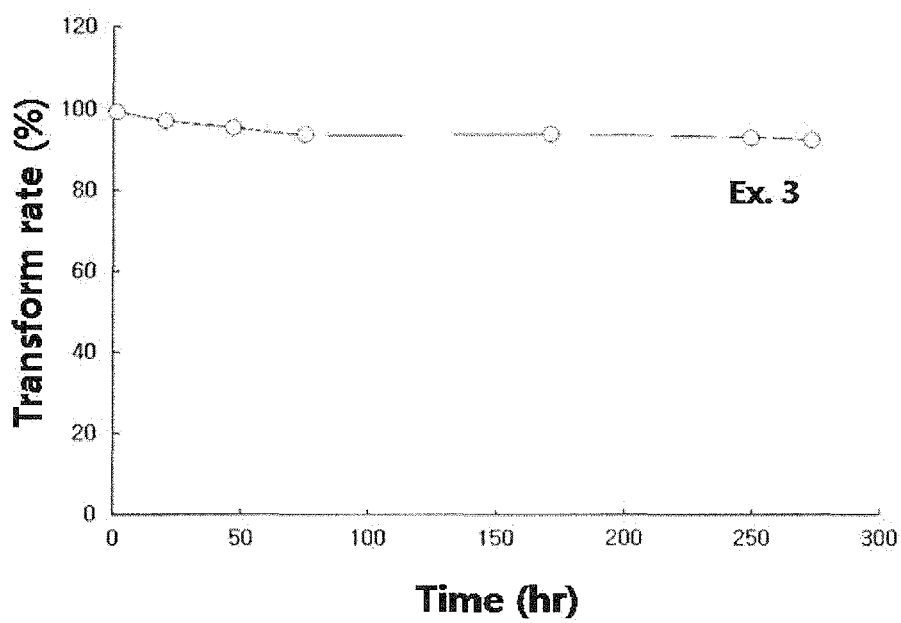
FIG. 2 shows catalysts performance prepared by Example 3 for the decomposition of perfluorinated depending on time.

The catalyst was introduced according to the same manner as Experimental Example 1 explained above, except for the difference of introducing He gas at 194.4 ml/min, instead of introducing He gas at 189.4 ml/min, and perfluorinated compound removal rate was measured over time. The result is shown in Table 3 and FIG. 2.

TABLE 3

| | Removal rate (%) | | | | |
|---|---|---|---|---|---|
| | 1 (day) | 3 (day) | 7 (day) | 10 (day) | 11 (day) |
| Ex. 3 | 97.0 | 93.7 | 93.0 | 93.0 | 92.0 |

Referring to Table 3, the Ru—P—Al catalyst of Example 3 had tetrafluoromethane removal rate of 97.0-92.0%, and even after tetrafluoromethane removal reaction that went on for 11 days, the transform rate was maintained above 92%.

According to an embodiment, since the Ru—P—Al tri-component catalyst can decompose halogen acidic gas-containing perfluorinated compounds with high decomposition efficiency and durability even when the perfluorinated compound removal reaction is continued for a long period of time, the Ru—P—Al tri-component catalyst can be used for the purpose of decomposing cleanser, etchant or solvent of perfluorinated compounds in semiconductor fabrication industry or LCD processing field, and also decomposing and removing perfluorinated compounds discharged in the process that involves use of halogen acidic gas such as $F_2$, $Cl_2$, $Br_2$.

Experimental Example 4

Measurement of Perfluorinated Compound Removal Rate According to $Cl_2$ Concentration in Reactor Experiment explained below was conducted to measure stability against acid, by comparing the perfluorinated compounds ($CF_4$) removal rate of Example 1 and control group according to $Cl_2$ concentration of aluminum phosphate catalyst in the reactor.

Figure 3:
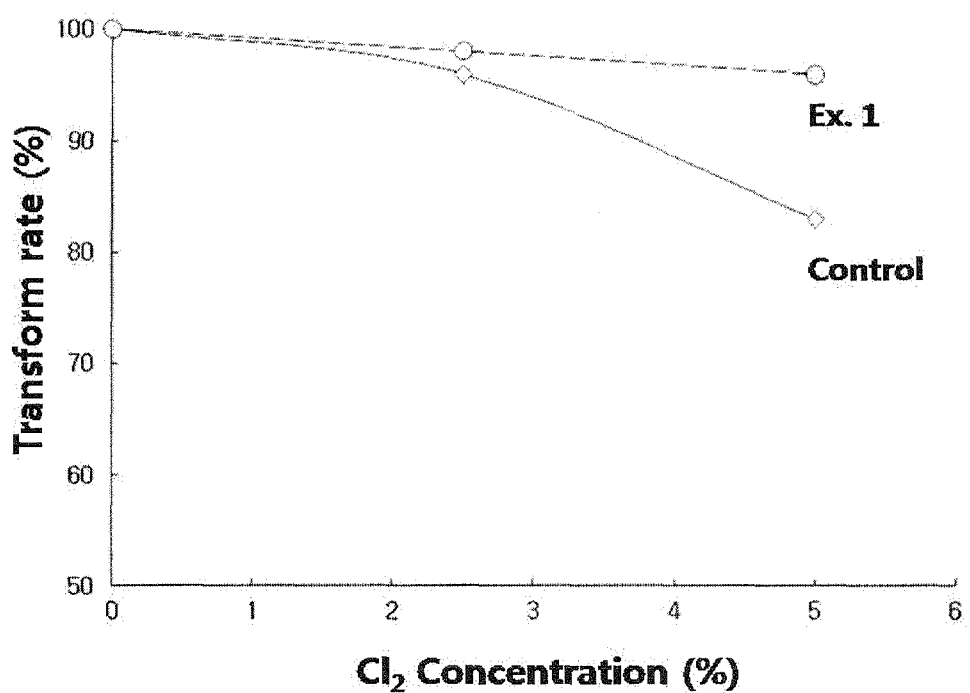
FIG. 3 shows catalysts performance for the decomposition of perfluorinated compound depending on the concentration of chlorine included in the reactant, according to the present invention.

The perfluorinated compound removal rate according to $Cl_2$ concentration in a reactor was measured, in the same manner as Example 3, except for the difference of using, instead of catalyst of Example 3, aluminum phosphate catalyst of Example 1 and of control group, and introducing $Cl_2$ at concentration of 0%, 2.5% and 5%. The result is shown in Table 4 and FIG. 3.

TABLE 4

| $Cl_2$ concentration | $CF_4$ decomposition rate (%) | | |
|---|---|---|---|
| | 0% | 2.5% | 5.0% |
| Ex. 1 | 100 | 98 | 96 |
| Control | 100 | 97 | 83 |

Referring to Table 4, the tetrafluoromethane removal rate of 0.3% Ru—P—Al catalyst of Example 1 according to $Cl_2$ concentration was 100% to 96% even with the increase of $Cl_2$ concentration, while the aluminum phosphate catalyst of the control group had the tetrafluoromethane removal rate which markedly decreased from 100% to 83% as the $Cl_2$ concentration increased. The catalyst of Example 1 particularly had tetrafluoromethane removal rate as high as approximately 13%, when $Cl_2$ concentration was 5.0% (see FIG. 3).

Accordingly, since the Ru—P—Al tri-component catalyst according to various embodiments provide high decomposition effect and durability in decomposing and removing halogen acidic gas-containing perfluorinated compounds, the Ru—P—Al tri-component catalyst can be advantageously used for the purpose of decomposing cleanser, etchant and solvent of the perfluorinated compounds to in the semiconductor manufacture industry or LCD fabrication field, or decomposing and removing perfluorinated compound discharged at a process that uses halogen acidic gas such as $F_2$, $Cl_2$, $Br_2$.

The invention claimed is:

1. A Ru—P—Al tri-component catalyst to decompose perfluorinated compounds, comprising an aluminum oxide catalyst, and a promoter supported on a surface of the catalyst, the promoter comprising, relative to 1 weight of aluminum oxide catalyst, 0.05-0.3 part by weight of ruthenium (Ru) and 1.0-5.0 part by weight of phosphorus (P).

2. The Ru—P—Al tri-component catalyst of claim 1, wherein aluminum oxide is one selected from the group consisting of gamma-alumina (γ-$Al_2O_3$), gamma-boehmite (γ-AlO(OH)), gamma-alumina trihydrate (Al(OH)$_3$), delta-alumina (δ-$Al_2O_3$), delta-boehmite (δ-AlO(OH)), delta-alumina trihydrate (δ-Al(OH)$_3$), eta-alumina (η-$Al_2O_3$), eta-boehmite (η-AlO(OH)), and eta-alumina trihydrate (η-Al(OH)$_3$).

3. The Ru—P—Al tri-component catalyst of claim 1, to decompose perfluorinated compounds in a process that involves use of halogen acidic gas.

4. The Ru—P—Al tri-component catalyst of claim 3, wherein the process is included in a semiconductor fabrication process or a liquid crystal display (LCD) fabrication process.

5. A method for preparing the Ru—P—Al tri-component catalyst of claim 1, comprising steps of:
   preparing precursor solution by dissolving, in distilled water, compound containing 0.05-0.3 part by weight of ruthenium, relative to weight of aluminum oxide; and compound containing 1.0-5.0 part by weight of phosphorus (P), relative to weight of aluminum oxide (Step 1); and
   depositing ruthenium and phosphorus in aluminum oxide, using the precursor solution prepared at Step 1 (Step 2).

6. The method of claim 5, wherein the depositing at Step 2 comprises a step of spray drying the precursor solution prepared at Step 1 on the aluminum oxide.

7. The method of claim 5, wherein the depositing at Step 2 comprises a step of adding aluminum oxide to the precursor solution prepared at Step 1, first drying at room temperature, second drying at or above 100° C., and calcinations at 400-600° C., air atmosphere and third drying.

8. The method of claim 5, wherein the compound containing ruthenium is one selected from the group consisting of ruthenium acetyl acetate ($Ru(acac)_3$), ruthenium chloride ($RuCl_3$), ruthenium iodide ($RuI_3$), ruthenium nitrosyl nitrate ($Ru(NO_3)NO$), and ruthenium oxide ($RuO_2.H_2O$).

9. The method of claim 5, wherein the compound containing phosphorus is one selected from the group consisting of diammonium hydrophosphate (($NH_4)_2HPO_4$), ammonium dihydrophosphate($NH_4H_2PO_4$) and phosphoric acid ($H_3PO_4$).

10. The method of claim 5, wherein the aluminum oxide is one selected from the group consisting of gamma-alumina ($\gamma$-$Al_2O_3$), gamma-boehmite ($\gamma$-AlO(OH)), gamma-alumina trihydrate ($Al(OH)_3$), delta-alumina ($\delta$-$Al_2O_3$), delta-boehmite ($\delta$-AlO(OH)), delta-alumina trihydrate ($\delta$-$Al(OH)_3$), eta-alumina ($\eta$-$Al_2O_3$), eta-boehmite ($\eta$-AlO(OH)), and eta-alumina trihydrate ($\eta$-$Al(OH)_3$).

\* \* \* \* \*